C. PLYER.
BUTTER-WORKER.

No. 178,078. Patented May 30, 1876.

WITNESSES:
John Goethals
Alex F. Roberts

INVENTOR:
Charles Plyer
BY
ATTORNEYS.

UNITED STATES PATENT OFFICE.

CHARLES PLYER, OF HEMPSTEAD, NEW YORK.

IMPROVEMENT IN BUTTER-WORKERS.

Specification forming part of Letters Patent No. 178,078, dated May 30, 1876; application filed May 9, 1876.

*To all whom it may concern:*

Figure 1:
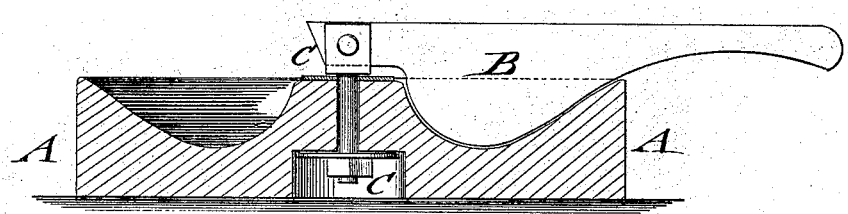
Figure 2:
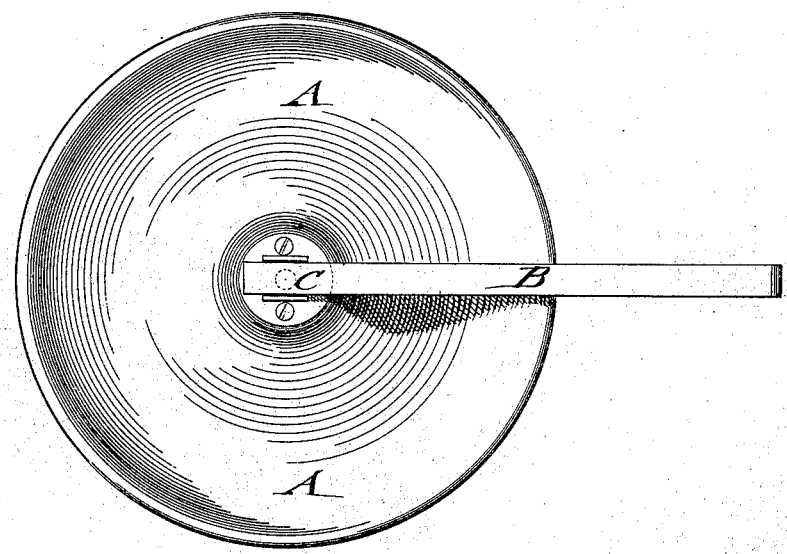

Be it known that I, CHARLES PLYER, of Hempstead, Queens county, New York, have invented a new and Improved Butter-Worker, of which the following is a specification:

Figure 1 represents a vertical central section of my improved butter-worker, and Fig. 2 a top view of the same.

Similar letters of reference indicate corresponding parts.

The object of my invention is to provide an improved butter-worker, that may be worked with great facility, cutting up the butter in a very effective manner, and accomplishing the work in an easier and quicker manner.

The invention consists of a concave dish with raised center, to which a swinging lever, of a shape corresponding to the dish, is swiveled to be worked all around the dish for cutting up the butter.

In the drawing, A represents a wooden dish with an annular cavity and raised center and outer rim. B is the working-lever, that is taken hold of by a handle part projecting outside of the circumference of the dish.

The dish A may be made of hard wood or other suitable material, the butter being put in, in lumps or slices, as most convenient, to be cut up and worked by the lever B, whose main part corresponds in shape and fits closely into the concave part of the dish.

The inner end of the lever B is pivoted to a swivel-bolt, C, to be swung up and down, and carried at the same time around the dish, and held radially thereon, to work up the butter in the same in a rapid, even, and effective manner, producing a saving in time and labor by the same.

Having thus described my invention, I claim as new and desire to secure by Letters Patent—

A butter-worker made of a round dish with annular concavity or indentation, and of a centrally pivoted and swiveled working-lever, corresponding to the concave part of the dish, to be operated substantially as specified.

CHARLES PLYER.

Witnesses:
ROBERT L. POWELL,
J. SEYMOUR SNEDEKER.